US008950884B2

(12) United States Patent
Stevens et al.

(10) Patent No.: US 8,950,884 B2
(45) Date of Patent: Feb. 10, 2015

(54) BACKLIGHT AND DISPLAY

(75) Inventors: Oliver Andrew Charles Stevens, Oxford (GB); David James Montgomery, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 557 days.

(21) Appl. No.: 12/529,574

(22) PCT Filed: Mar. 4, 2008

(86) PCT No.: PCT/JP2008/054238
§ 371 (c)(1),
(2), (4) Date: Sep. 17, 2009

(87) PCT Pub. No.: WO2008/108480
PCT Pub. Date: Sep. 12, 2008

(65) Prior Publication Data
US 2010/0061087 A1   Mar. 11, 2010

(30) Foreign Application Priority Data

Mar. 5, 2007  (GB) .................................. 0704127.0

(51) Int. Cl.
*G09F 13/04* (2006.01)
*G02F 1/1335* (2006.01)
(52) U.S. Cl.
CPC .... *G02F 1/133603* (2013.01); *G02F 1/133605* (2013.01)
USPC .......... 362/97.3; 362/97.1; 362/355; 362/341
(58) Field of Classification Search
USPC ......... 362/97.1, 97.2, 97.3, 355, 341, 249.02, 362/609, 612; 349/64
See application file for complete search history.

(56) References Cited

U.S. PATENT DOCUMENTS

| 5,819,454 | A | * | 10/1998 | Rosenitsch | 40/452 |
| 7,172,325 | B2 | * | 2/2007 | Kim et al. | 362/561 |
| 7,837,375 | B2 | * | 11/2010 | Watanabe et al. | 362/613 |

(Continued)

FOREIGN PATENT DOCUMENTS

WO   WO 2006126802 A1 * 11/2006

OTHER PUBLICATIONS

International Search Report and Written Opinion for corresponding Application No. PCT/JP2008/054238 mailed Apr. 15, 2008.

(Continued)

*Primary Examiner* — Anh Mai
*Assistant Examiner* — Jessica M Apenteng
(74) *Attorney, Agent, or Firm* — Renner, Otto, Boisselle & Sklar, LLP

(57) ABSTRACT

A backlight is provided for a direct-view display. The backlight comprises a plurality of discrete light sources (11), such as light emitting diodes, spaced from a diffuser (5). The light sources are arranged as sets cooperating with a mirror structure (101), which surrounds the set to form a region. The regions substantially tessellate the area of the backlight. Each mirror structure (101) comprises a plurality of mirror segments which are curved and concave in cross-section perpendicular to the diffuser (5). The mirror segments extend from around the light sources (11) towards the diffuser (5). The edges of adjacent mirror segments of adjacent regions meet at a meeting line such that all of the meeting lines are at the diffuser (5) or between the diffuser (5) and the light sources (11).

34 Claims, 13 Drawing Sheets

(56) References Cited

U.S. PATENT DOCUMENTS

| | | | |
|---|---|---|---|
| 2005/0185419 A1* | 8/2005 | Holman et al. | 362/561 |
| 2005/0276069 A1* | 12/2005 | Taniguchi et al. | 362/600 |
| 2006/0221611 A1* | 10/2006 | Noh et al. | 362/247 |
| 2006/0221612 A1* | 10/2006 | Song et al. | 362/247 |
| 2007/0297172 A1* | 12/2007 | Furukawa et al. | 362/231 |
| 2008/0101069 A1* | 5/2008 | Chang | 362/247 |
| 2008/0259252 A1* | 10/2008 | Tanaka et al. | 349/69 |

OTHER PUBLICATIONS

British Search Report for corresponding Application No. GB0704127.0 dated Jul. 5, 2007.

\* cited by examiner

BACKLIGHT AND DISPLAY

TECHNICAL FIELD

The present invention relates to a backlight, for example for use with an at least partially transmissive spatial light modulator. The present invention also relates to a display including such a backlight.

BACKGROUND ART

EP 01722267 (Samsung) describes a uniform direct-view backlight whereby a plurality of LED (light emitting diode) light sources is interspersed with vertical reflective barrier columns that extend across the horizontal width of the display. These columns support a diffusion plate that sits behind a liquid crystal display. The columns separate more than one LED in a row. Synchronous switching of the rows of LEDs between the columns with the display refresh rate allows reduced motion blur artifacts.

US 2006/0290840 (LG Philips) describes a uniform direct-view backlight whereby a regular array of LEDs is positioned on a circuit board behind a liquid crystal display (LCD). Each LED has a lens structure made into the LED to modify the emission profile. There also exist supports for an optical diverter spaced between the LEDs and the display. The optical design of the diverter and LED lens structure is such as to give a uniform illumination of the display.

U.S. Pat. No. 7,072,096 (Digital Optics International Corporation) describes a uniform direct-view backlight composed of an array of LEDs and one or more prism sheets to form a uniform directed illumination arrangement. One embodiment describes the use of vertically orientated triangular mirrors surrounding zones containing a plurality of LEDs. These mirrors recycle reflected light from the prism film and improve brightness.

WO 05071643 (Shanghai Sansi Technology Co.) describes a uniform direct-view backlight utilizing an array of LEDs placed a fixed distance behind an LCD. Each individual LED has a rounded square reflector extending vertically from the circuit board on which the LED is mounted. The reflector has a circular cross-section. The purpose of the patent is to improve brightness of the display by sending more high-angle light forward.

JP 2006/190847 (Citizen Electrical) describes a uniform direct-view backlight comprising an array of LEDs placed a fixed distance behind an LCD. Surrounding the whole array is a vertical mirror that extends from the LED plane to the LCD. The purpose of this patent is to improve colour uniformity towards the edges of the display as more light is lost from these areas.

U.S. Pat. No. 25,128,744 (Dialight Corporation) describes an LED array for directed light applications whereby one or more of the LEDs are surrounded by a circular reflector with a conic cross section. The reflectors are identical and arranged uniformly across the array. The purpose of this system is to replace lenses for illumination applications, for example in a traffic light.

FIG. 1 of the accompanying drawings illustrates a typical display of known type that is used in large area devices such as large area televisions and display screens. The display, 1, comprises a flat transmissive spatial light modulator (SLM) in the form of a liquid crystal display (LCD) panel 4 having input and output polarisers 2 and 3. The panel 1 is provided with a backlight 9, whose main components are a diffuser 5, an array 6 of small point-like light sources 11 and a rear reflector plane 7. There may also be separation pillars 8 which may be transparent and are designed to maintain the separation between the diffuser 5 and the light source plane 6.

There is also driving electronics 12 for the light sources 11. Prism based brightness enhancement films and polarised reflectors (not shown) may also be used.

The light source array 6 and diffuser 5 have an area or "size" in a plane perpendicular to the plane of FIG. 1 at least as big as the display area of the panel 4 with a thickness typically much less than its other dimensions. The backlight unit 9 is placed behind the LCD 4 and is directed to illuminate the rear part of the LCD and through to the observer 10.

The backlight unit 9 comprises the diffuser 5, which that is placed nearer to the LCD 4. Behind the diffuser 5, parallel thereto and at a fixed distance therefrom, there is placed the light source array. Each element of the array is substantially identical and emits light in a parallel direction towards the diffuser. The reflector plate 7 sits surrounding the light source array and is used to recycle reflected light back through the system to improve brightness.

The small point-like light sources 11 may be Light Emitting Diodes (LEDs).

The light source array 6 may comprise individual LED structures 11 utilising blue or ultraviolet LEDs with phosphors, or integrated red, green and blue LEDs located close to each other as a single "point" in the array. LED driving electronics 12 are typically positioned behind the reflector plate.

The action of the diffuser 5 is to spread the emitted light from the LEDs over a wide angle and to form the basis for a comfortable viewing plane for the observer 10. However, single diffusers are typically inefficient at improving the spatial uniformity of illumination passing through them. Thus it is necessary to have reasonably uniform illumination onto them from the light plane 6.

DISCLOSURE OF INVENTION

According to a first aspect of the invention, there is provided a display backlight comprising a plurality of discrete light sources spaced from a diffuser, the sources being arranged as sets, each of at least some of which comprises a plurality of the sources, cooperating with a mirror structure which surrounds the set to form a region, the regions being arranged as a two dimensional array which substantially tessellates the area of the backlight, each mirror structure comprising a plurality of mirror segments, of curved concave cross-section in a plane substantially perpendicular to the diffuser, extending from around the sources of the set towards the diffuser, the edges of adjacent mirror segments of adjacent regions meeting at a meeting line with all of the meeting lines being at the diffuser or between the diffuser and the sources.

Each mirror segment may be arranged to reflect light incident thereon, at least from the sources adjacent the mirror segment, directly onto the diffuser.

Each of the at least some sets may comprise at least three sources.

The sources may all be of substantially the same type.
The sources may be substantially point-sources.
The sources may be of Lambertian type.
The sources may be light emitting diodes.
The light sources may be substantially white light sources.
The adjacent ends of adjacent mirror segments of each region may meet at curved lines.

The meeting lines may be straight lines. All of the meeting lines may be in a first common plane.

The diffuser may be a plane diffuser. The first common plane may be substantially at the diffuser plane.

Each plane, which intersects the mirror segments and which is parallel to the first common plane, may intersect each of the mirror segments at a straight line of intersection. Each mirror segment may be of substantially constant cross-sectional shape along each line of intersection. The cross-sectional shape may be substantially defined by the lateral distance with respect to an origin at the meeting line being proportional to distance perpendicularly from the first common plane raised to the power 1.2.

The sources may be disposed substantially in a second common plane. The second common plane may be substantially parallel to the diffuser plane. The mirror segments of each region may meet the second common plane at a polygon. The sources of each of the at least some sets may be arranged in a pattern having an outline which is similar to the polygon.

The regions may all be of the same shape and may have the same number of sources. The regions may be one of triangular, square and hexagonal.

As an alternative, the regions may comprise a first set of regions, each of which is of a first shape and/or has a first number of sources, disposed in an inner area of the backlight and a second set of regions, each of which is of a second shape different from the first shape and/or has a second number of sources different from the first number of sources, disposed in an outer area of the backlight. The regions of the first and second sets may be triangular and square, respectively. The second number may be larger than the first number.

According to a second aspect of the invention, there is provided a display comprising a backlight according to the first aspect of the invention disposed behind a spatial light modulator.

The modulator may comprise a liquid crystal device.

It is thus possible to provide a backlight for a direct-view display which provides a high level of uniformity of illumination. For a fixed separation between the diffuser and the light sources, fewer light sources are required to achieve a desired level of uniformity of illumination. Also, conventional or standard light sources, such as light emitting diodes, may be used. It is thus possible to provide a backlight of reduced cost requiring reduced complexity of drive circuitry for the light sources.

BEST MODE FOR CARRYING OUT THE INVENTION

Figure 2:
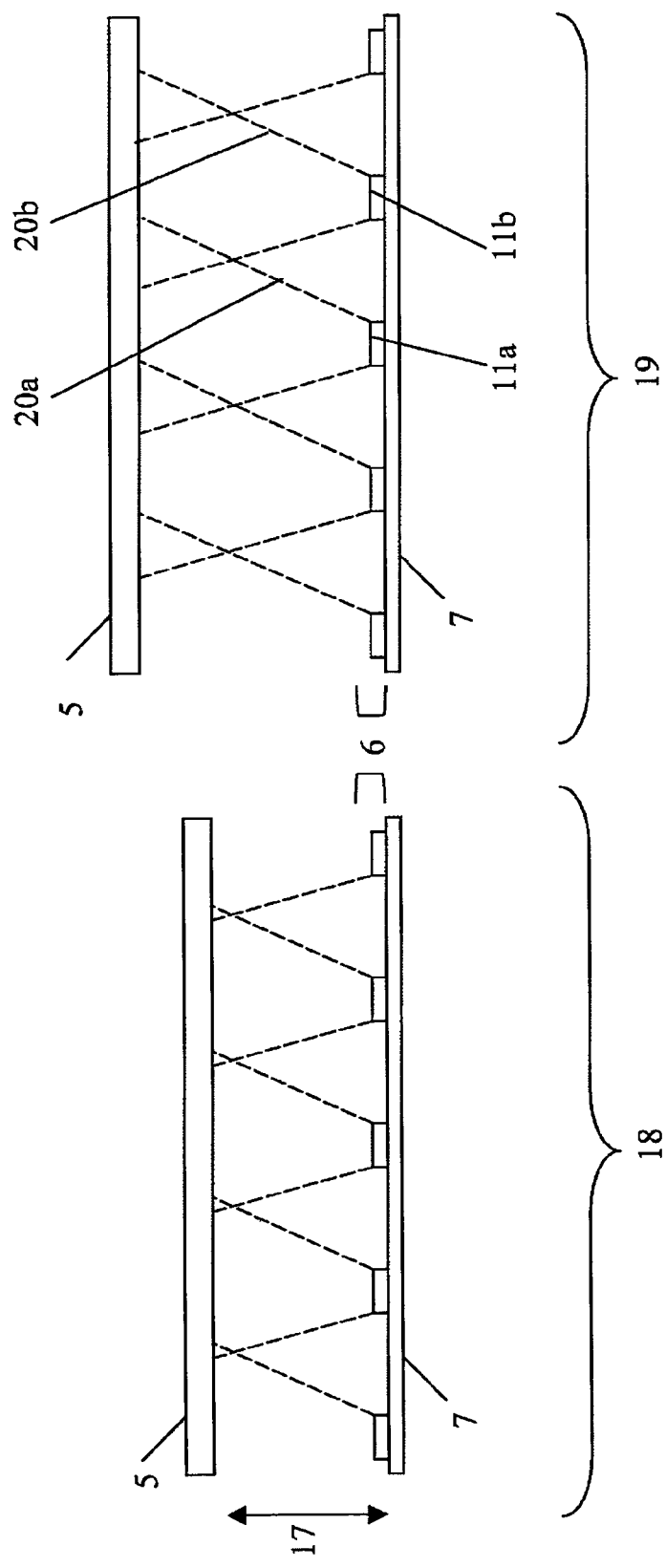
FIGS. 2 to 4 illustrate techniques for improving uniformity of illumination by a backlight.
Figure 3:
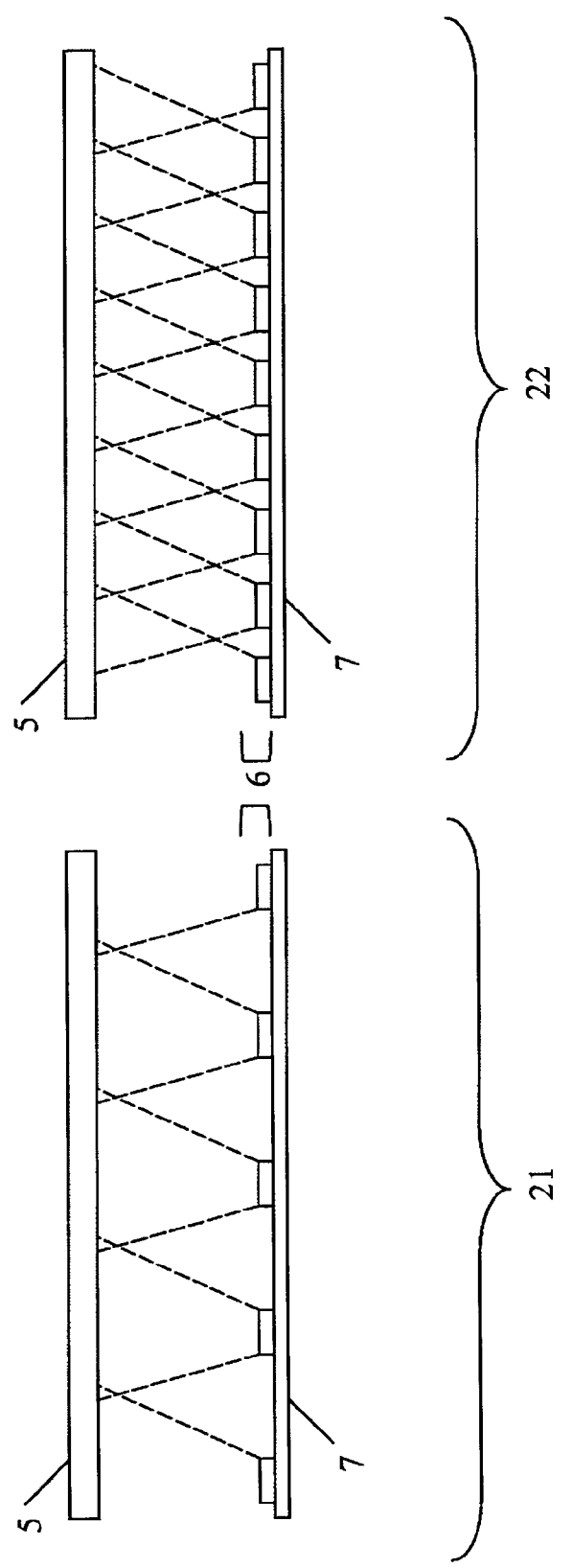
Figure 4:
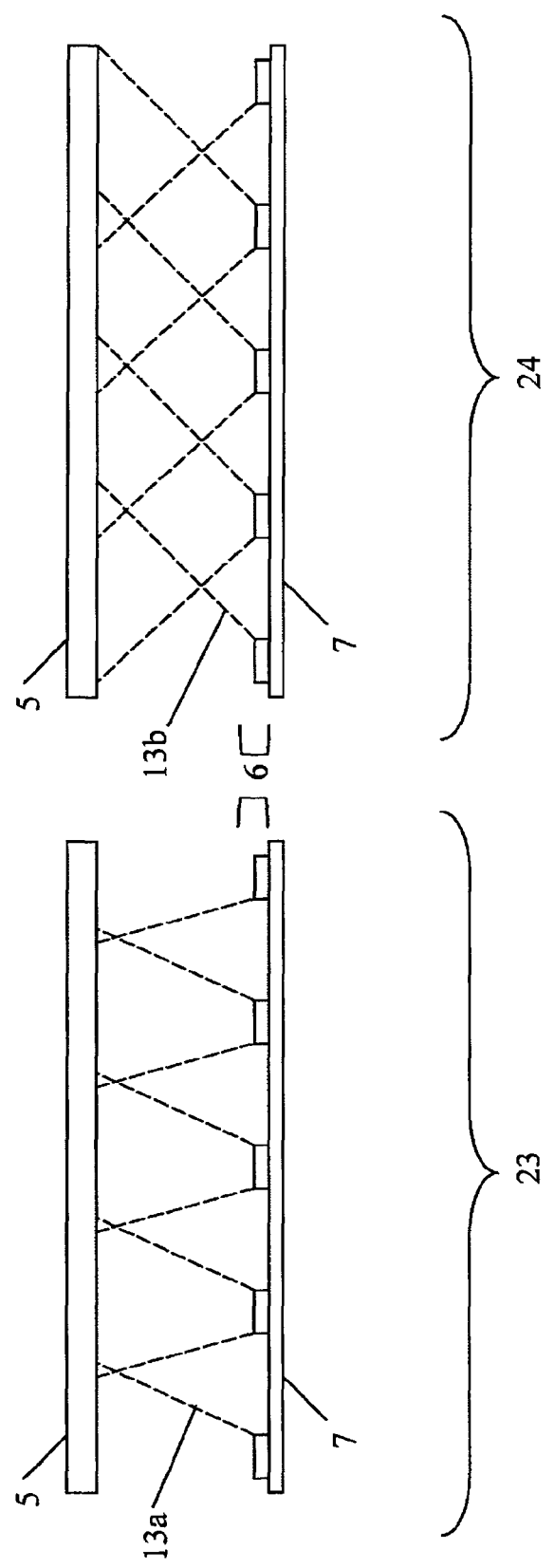

FIGS. 2 to 4 illustrate three ways of controlling the illumination from the light source plane.

The first way (FIG. 2) is by controlling the distance 17 between the light source plane 6 and the diffuser 5. A plane 6 placed further away (19) will illuminate the diffuser 5 more uniformly than nearer (18). This is because the emission 20a from each source 11a has more space to merge into the illumination 20b from a neighbouring source 11b. However, there will be significantly more lost light and, at the extreme, the light source plane will need to be substantially bigger than the diffuser to maintain viewing angle properties of the display. These practical and also aesthetic considerations typically limit the maximum separation to a fixed value (normally not more than a few centimeters, depending on the display).

The second way (FIG. 3) is to use a higher density array (22) of point emitters 11 (LEDs) than previously (21). There is clearly a limit to this, mainly with regard to cost. For a given display brightness, using a greater number of lower-power LEDs will substantially increase the costs, along with more complicated LED driving and control circuitry. Cost is a significant negative factor of LED based backlights over other existing backlight technologies such as cold cathode fluorescent lamps (CCFLs), and so there is usually strong pressure to reduce costs. One possible way to do this is to use a lower number of higher-power LEDs.

Figure 5:
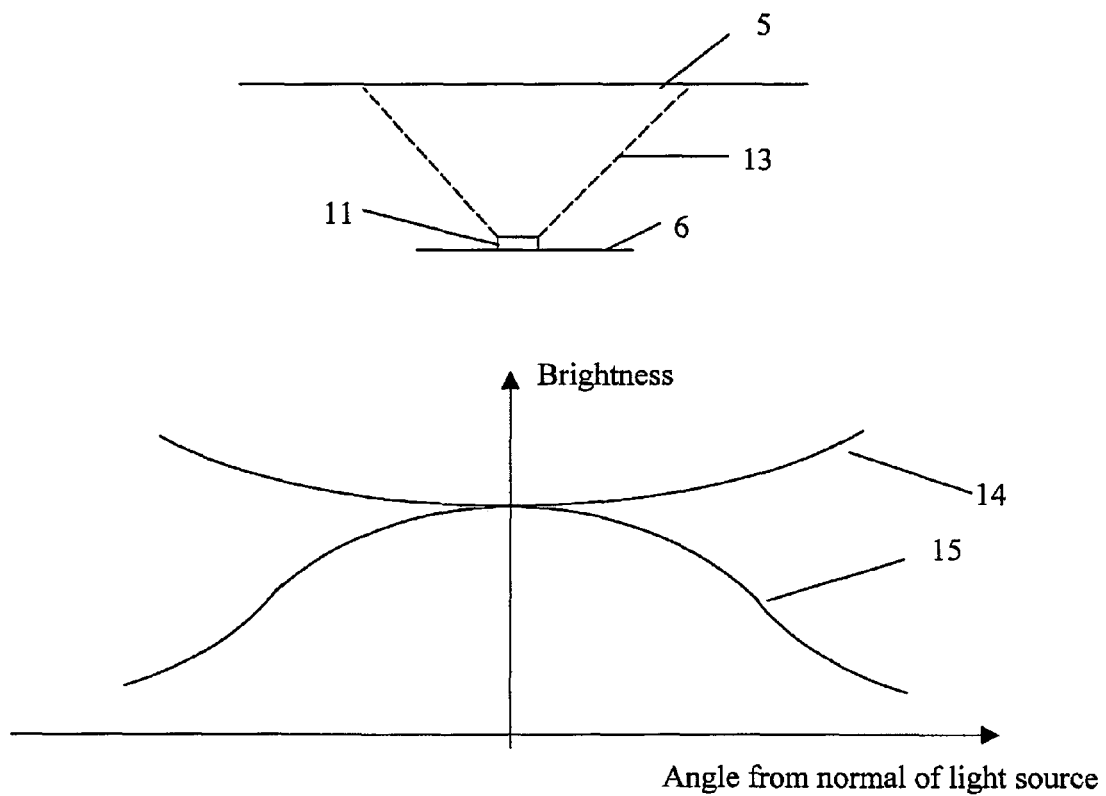
FIG. 5 illustrates diagrammatically desirable point light source emission profiles.

The third way (FIG. 4) to improve illumination is to modify the emission profile 13a (the brightness emitted at a particular angle) of the individual sources or introduce additional optical elements around the LEDs (24) over previously (23). A narrow emission profile 13a would give a low uniformity whereas a wide emission profile 13b would give a high uniformity. This can be done by refractive optical structures, sectioned light-guides or individual reflectors applied to the LEDs (not shown). Because the light sources illuminate a flat plane (diffuser 5), the required emission profile (14 in FIG. 5) is quite different from the normal emission patterns of LEDs (near-Lambertian emission 15). Thus the individual modification requires complex designs. As with the number of LEDs in the backlight, this becomes a significant cost issue.

Embodiments of the invention seek to utilise light that is emitted from the sources at a large angle to the normal of the light source plane. Some LEDs are replaced by mirror structures in a regular manner across the light source plane.

This large angle light is reflected by the mirror structures, thus eliminating the non-uniformity caused by the loss of the LEDs.

The improvement is independent of the separation or the emission profile of the LEDs. There is a requirement that there is some emission at high angles but not such a high percentage as shown by 14 in FIG. 5. For example, a more natural emission profile similar to 15 would be sufficient. Fewer LEDs are required than with equivalent known backlights. Conversely, for a given number of LEDs, the separation between the light sources and the diffuser can be reduced and/or the conditions on or requirements of the emission profile may be relaxed.

Figure 1:
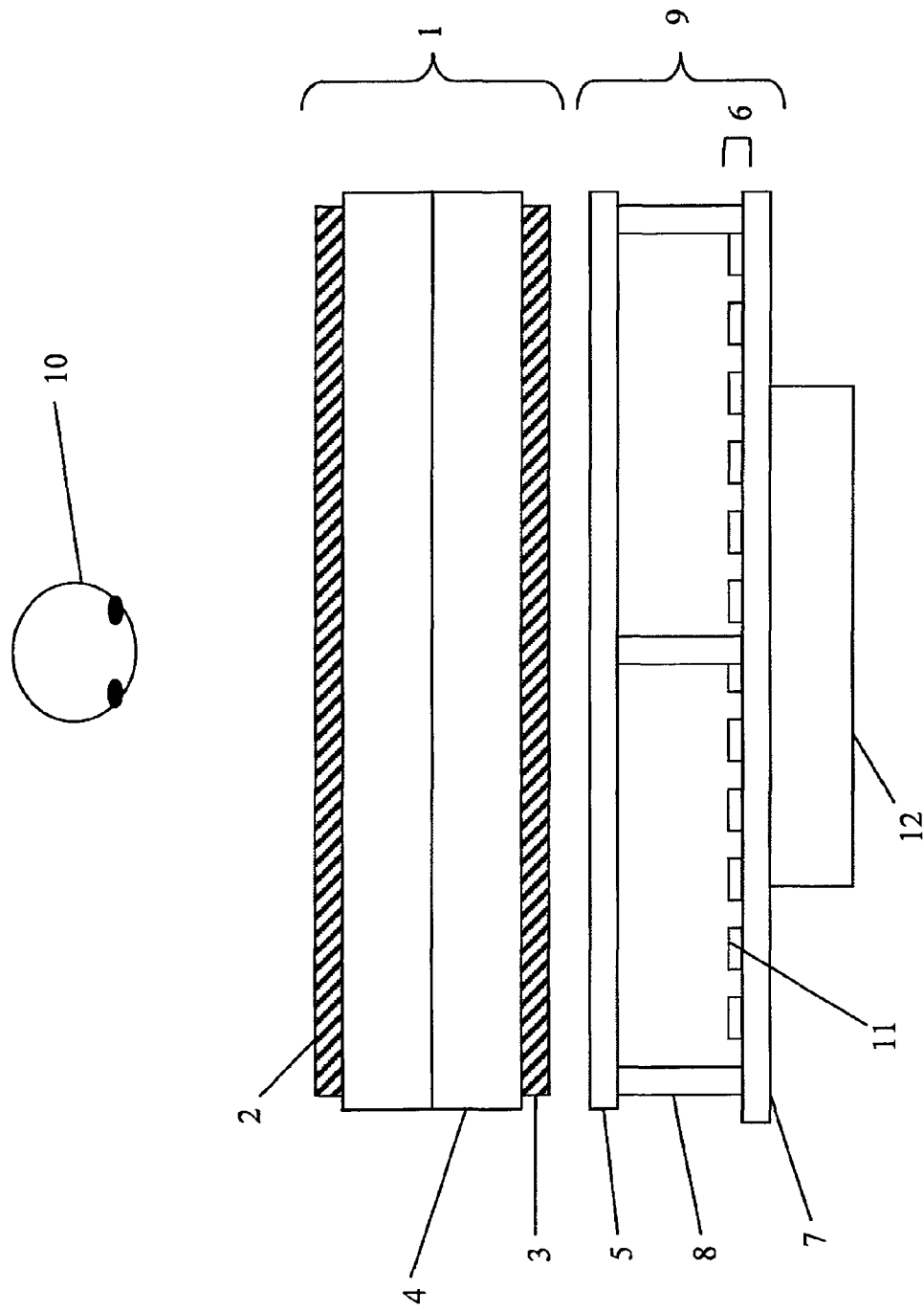
FIG. 1 is a cross-sectional view of a known type of direct-view display.
Figure 6:
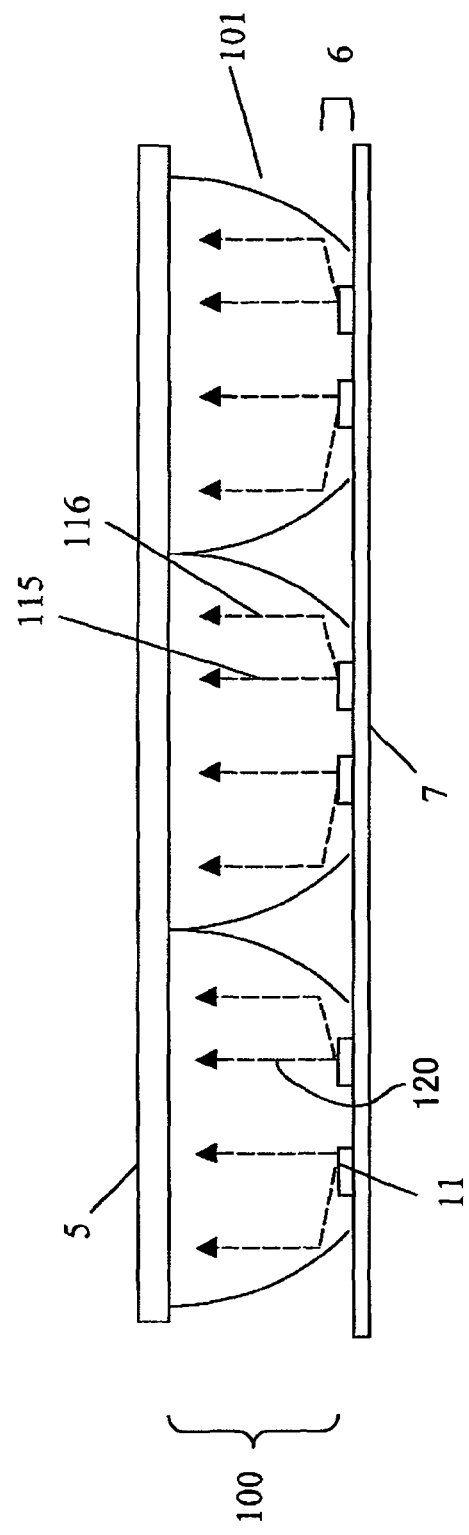
FIG. 6 is a cross-sectional view of a backlight constituting an embodiment of the invention.

FIG. 6 illustrates a display 100, which differs from that shown in FIG. 1 in that there is a different arrangement of point-like light sources 11 and that there are curved mirror segments 101 that are regular and intersect the light source pattern arrangement in the same pattern. The segments are linear and extend from the light source plane substantially to the diffuser plane 5. The mirror structures surround and separate identical groups of light sources. The sources are then arranged in each separated group such that the interaction between light 115 from the sources and the reflections 116 from the mirror, which mimic the light emitted from 'missing' sources that would be where the mirrors are, produce a uniform illumination.

The light sources 11 are "discrete" in the sense that they are deliberately spaced apart in the plane 6. Although it is possible for the discrete light sources 11 to be of more than one colour, it is likely that each light source 11 in most embodiments will be arranged to emit substantially white light. White light sources may be of the types described hereinbefore with reference to FIG. 1. For example, each source may be arranged to emit blue and ultraviolet light with the blue light contributing to the light output and the ultraviolet light being converted to red and green light by means suitable phosphors forming part of the device package.

As an alternative, each of the sources 11 may comprise a plurality of individual sources, such as red, green and blue sources, adjacent each other so as to be effectively non-discrete with their outputs blending together to provide substantially white light. However, any suitable arrangement may be used to provide a device which, in this application, acts as a single discrete light source.

The number of sources required in this arrangement is substantially less than that needed without the mirror segments.

Figure 7:
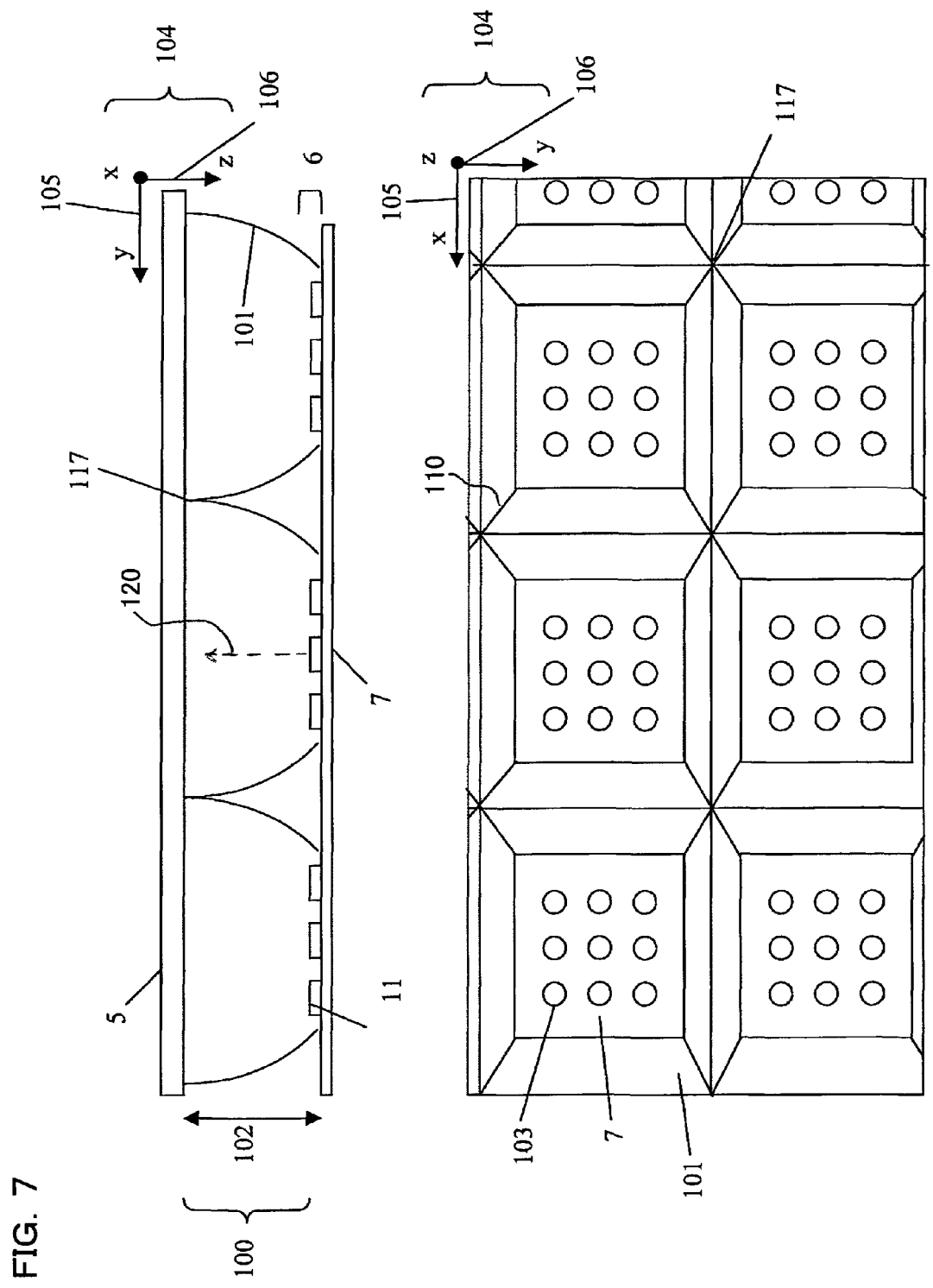
FIG. 7 is a cross-sectional view and a plan view of a backlight constituting another embodiment of the invention.

FIG. 7 illustrates an embodiment comprising a flat diffuser 5 and a light source plane 6 separated by a distance of 20 mm (102). The light source plane is interspersed with a reflector layer 7 for light recycling.

The actual value of separation of 20 mm in this case is for illustration purposes only and to serve as a relative marker. The system may be scaled in a linear fashion in a straightforward manner.

Curved mirrors 101 extend between the light source 6 and diffuser plane 5. The mirrors are in a square pattern and each open square between the mirrors contains nine light sources 103 also in a substantially square grid pattern. The ends of the mirrors 101 meet at curved lines such as 110, which appear straight in the plan views of the drawings.

This embodiment is not limited to nine light sources per group and may, for example, comprise a greater number per group. However, groups of nine are considered advantageous.

The light source points 11 are substantially identical and all lie substantially in the same plane 6. The light source points can be LEDs of very small emitting area. The sources are assumed to be Lambertian in their emission profile. Similarly, the exact emission profile is not important other than that there is small emission at high angles to the normal.

This profile is used for illustrative purposes only.

Axes 104 on the diagram are defined as the z axis being normal to both the diffuser and light source planes. The origin 106 is at the diffuser plane and the positive direction is towards the light source plane (away from the display 4). The x and y axes 105 are in the light-source/diffuser planes and are parallel to the two mirror directions.

The mirrors 11 are identical and symmetric on all sides of the sectioned area.

The mirrors 101 are arranged to reflect light incident on them, from at least the adjacent light sources but preferably from all of the light sources surrounded by the mirrors, directly (i.e. without reflection) onto the diffuser 5. In particular, light at high angles, for example between 45° and 90° to the light source axes is reflected directly onto the diffuser and, after reflection, may travel parallel or nearly parallel to the light source axes, such as 120.

Figure 8:
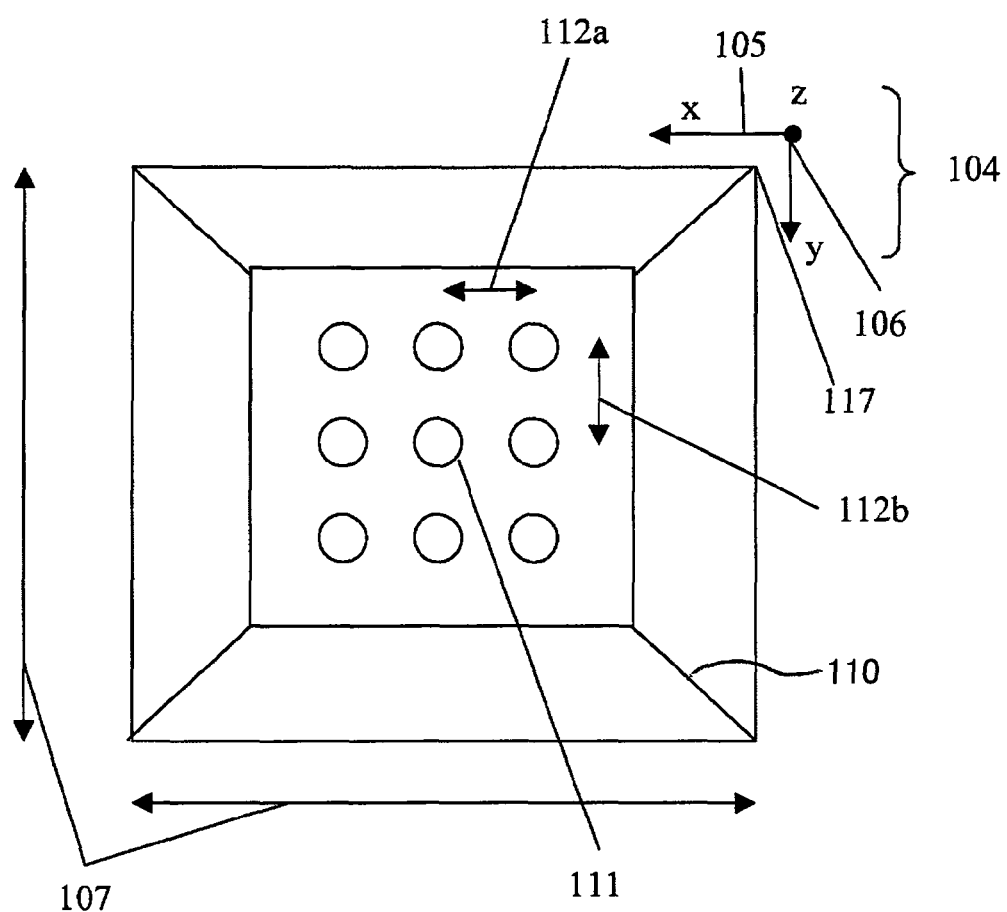
FIG. 8 is a plan view illustrating a detail of the backlight shown in FIG. 7 to a larger scale.

Consider a single section of this arrangement (FIG. 8) containing mirrors on all sides and nine light sources. The square is 68 mm each side 107 (using the same scale as above).

The corner (at the apex 117 at the diffuser plane 5) can be considered the origin in the x/y plane 104. One possible arrangement of the nine sources in a square array uses a single source in the centre of the square 111. The spacing of the other eight is 20 mm horizontally 112a and vertically 112b.

The light source pattern 111 may not be in a perfect square grid. For example, the positions of one or more light sources may differ from the regular grid pattern to improve uniformity, even though in this embodiment they are shown in a regular arrangement.

Figure 9:
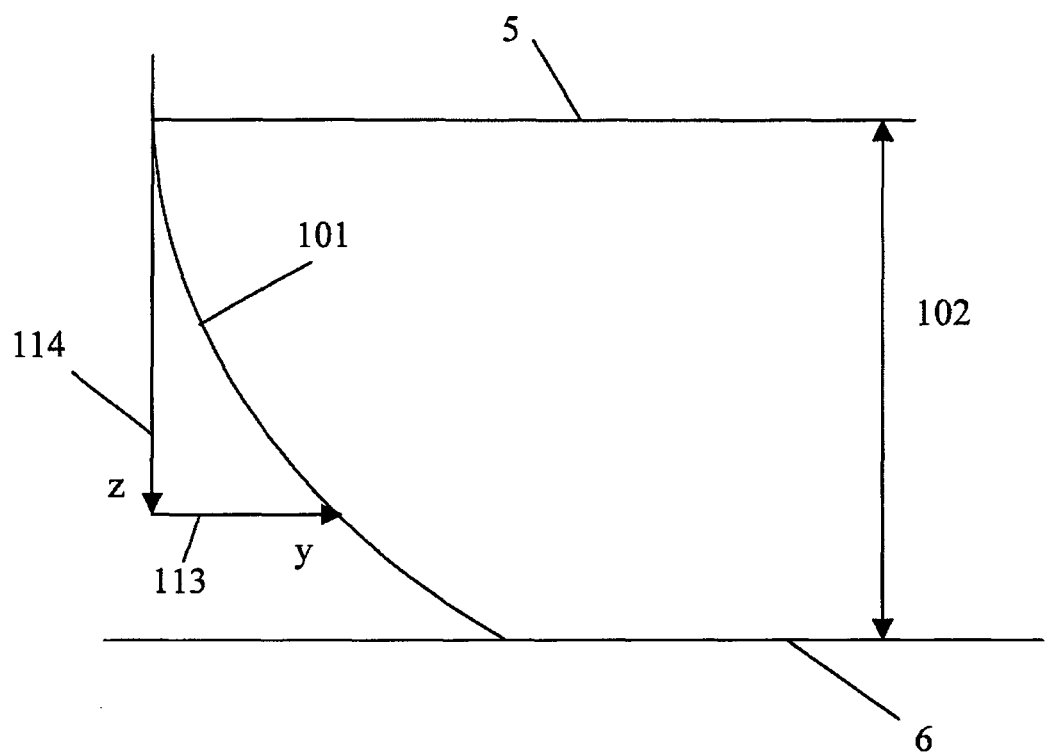
FIG. 9 is a cross-sectional view illustrating a mirror profile of the backlight of FIG. 8.

The mirror shape (FIG. 9) follows equation 1:

$$y = K\left(\frac{z}{L}\right)^R \quad \text{(Eq. 1)}$$

where y is the y coordinate 113 along the plane, z is the distance 114 from the diffuser plane 5 (z=0 at the diffuser plane, z=20 mm at the light source plane), L=20 mm, the distance between the planes 102. K=4.352 mm and R=1.2. The mirror curve is lenticular (does not change along one side) and is substantially the same on all four sides.

Such an arrangement will produce >95% uniformity on the diffuser over a large area. Taking an example size of an approximately 28" display, 432 light sources would be required in this area for >95% uniformity.

Identical light sources without mirrors in a square arrangement would require 619 light sources for >95% uniformity. This aspect thus provides a reduction of 30% over the case without mirrors. Alternatively, a greater separation of 24 mm would be required for such uniformity with 432 sources in a standard square arrangement.

Figure 10:
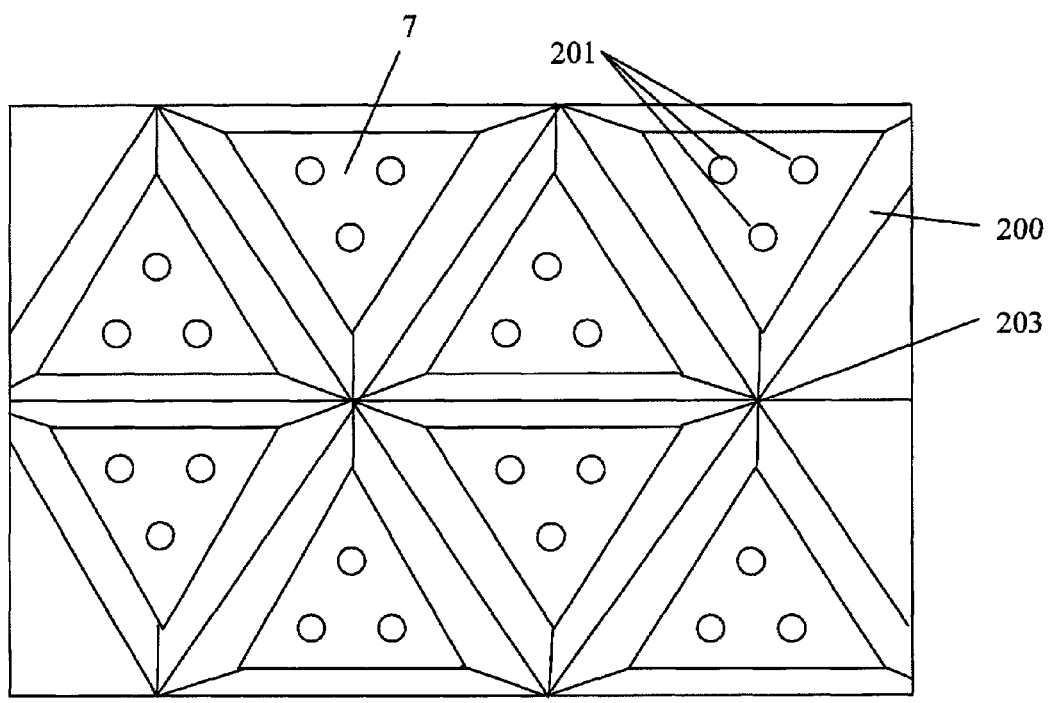
FIG. 10 is a plan view of a backlight constituting a further embodiment of the invention.

In the embodiment shown in FIG. 10, the mirrors 200 are in a tessellating equilateral triangular arrangement, each mirror segment containing three light sources 201. The light sources are in a triangular arrangement. This embodiment is not limited to triangular mirror arrangements 200 with only three sources 201, as more can be enclosed. Also, the precise positioning of each source may not follow a precise triangular pattern.

In a specific example of this embodiment, the mirrors 200 are lenticular and substantially identical on the three sides and are defined by equation 1 above where K=3.627 mm, R=1.2, L=20 mm. The lenticular length of one edge along the apex of the mirror at the diffuser is 56.97 mm.

Figure 11:
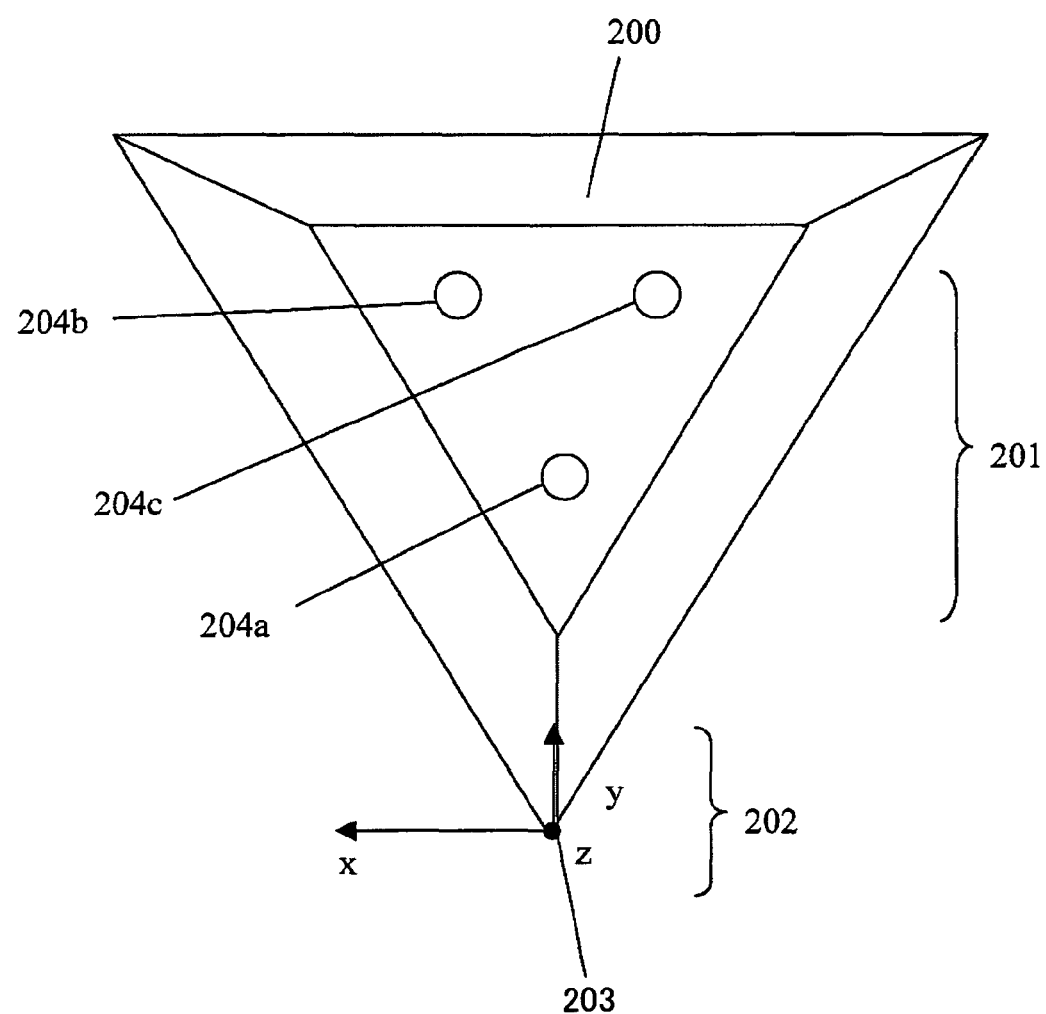
FIG. 11 is a plan view to an enlarged scale of a detail of the backlight of FIG. 10.

If we define the origin 203 of the x/y plane 202 at the corner of one triangle at the apex at the diffuser 5, the three light sources in the triangle can be placed at the locations shown in FIG. 11. The sources are placed at x=0 mm, y=17.8 mm (204a); x=11 mm, y=36.86 mm (204b); and x=−11 mm, y=36.86 mm (204c).

Such an arrangement will produce >95% uniformity on the diffuser over a large area. Taking the example of the approximately 28" display, 480 light sources would be required in this area for >95% uniformity.

Identical light sources without mirrors in a triangular arrangement would require 622 light sources for >95% uniformity. Alternatively, a greater separation of 24 mm would be required for such uniformity with 480 sources in a standard triangular arrangement.

Figure 12:
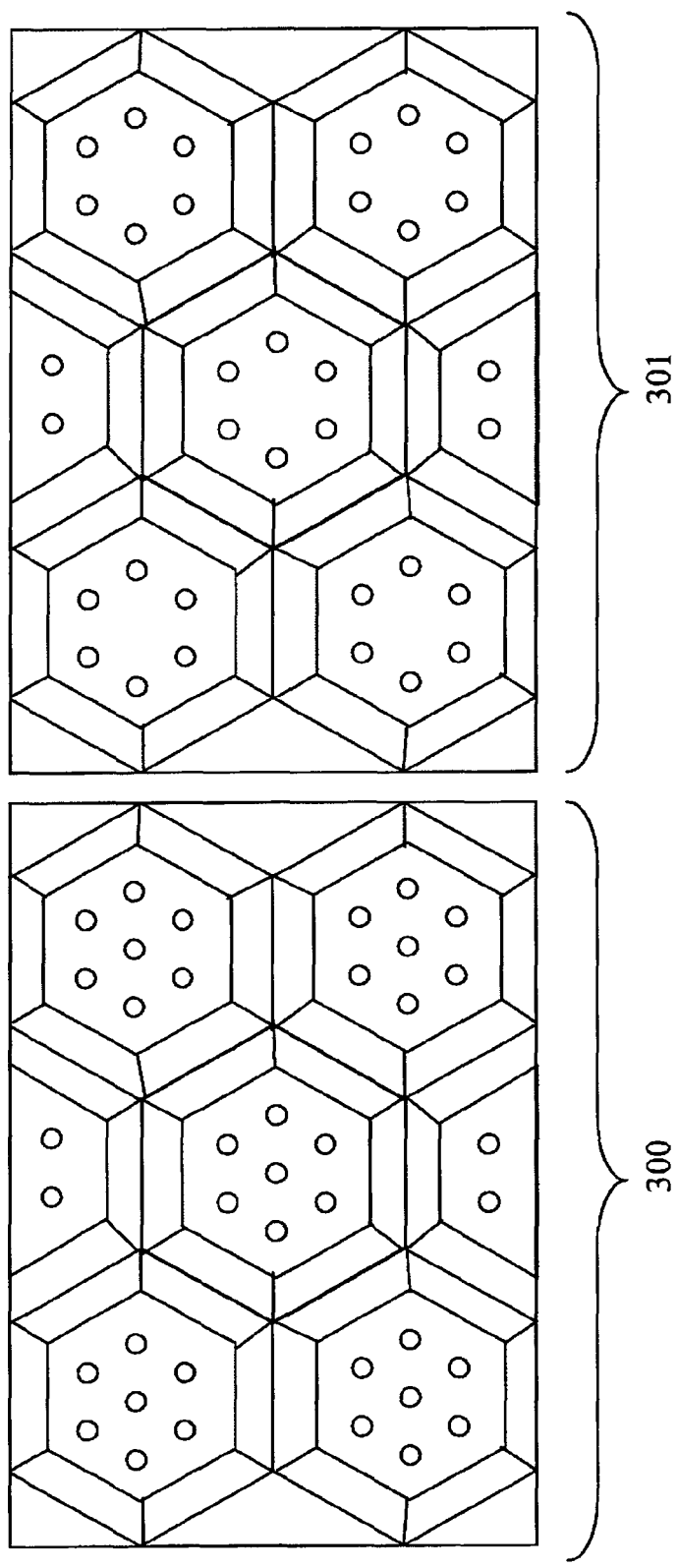
FIG. 12 is a plan view of backlights constituting further embodiments of the invention.

Any tessellating structure may be used. For example, a hexagonal arrangement of mirrors and light sources is shown in FIG. 12. This can apply with or without triangular symmetry. The light source group 300 in the figure has triangular symmetry. In this case both the hexagonal and the triangular mirror arrangements can be applied. Note that the optimum source positions for good uniformity may not match the ideal grid position. The light source group 301 shows only hexagonal symmetry.

Figure 13:
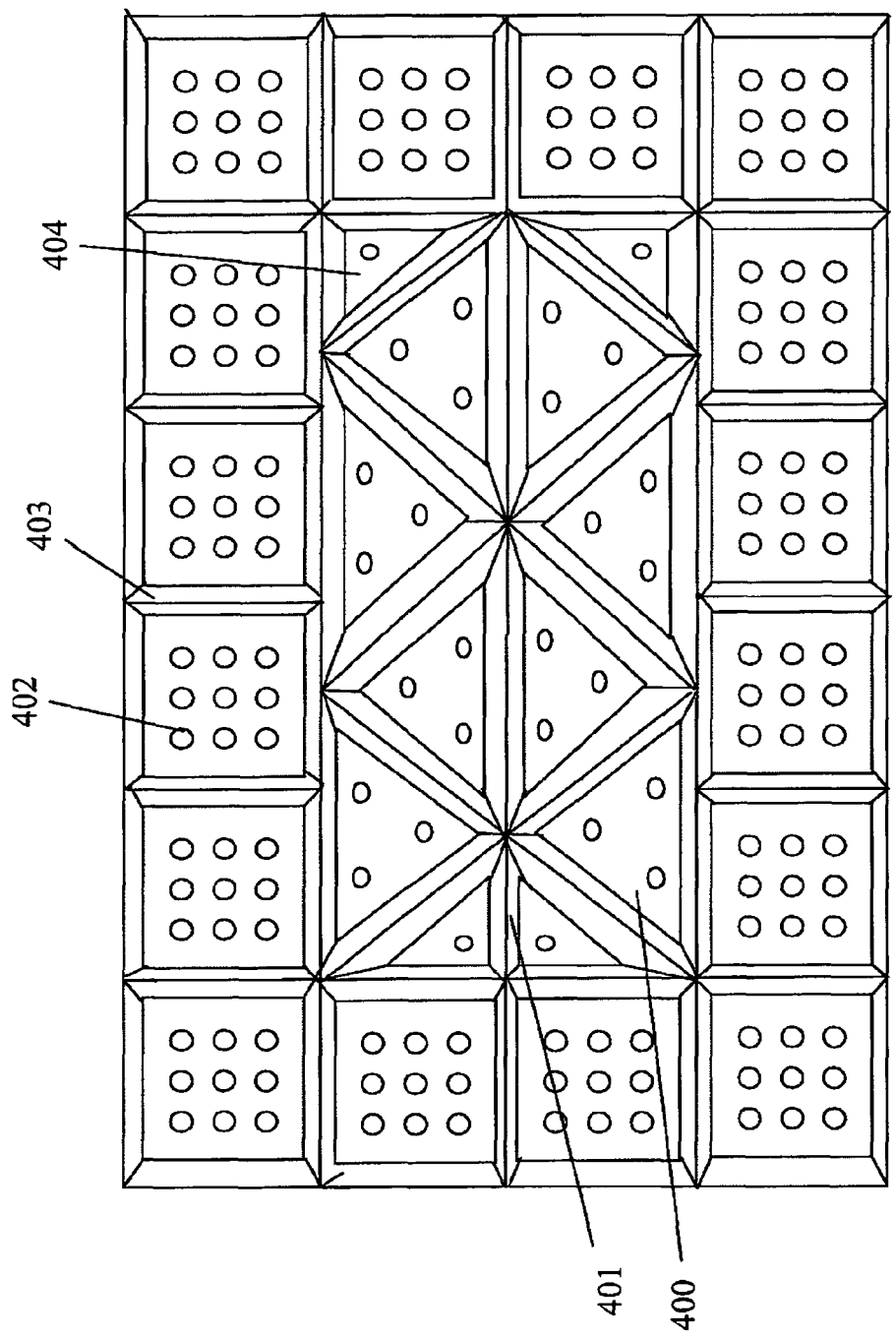
FIG. 13 is a plan view of a backlight constituting yet another embodiment of the invention.

Regular tessellating structures and non-regular tessellating structures, where there are variations in shapes of the areas across the display (FIG. 13), may be used. For example, an arrangement may have small groups of sources 400 with close mirrors 401 centrally in the display 1, where the uniformity is needed to be high. Towards the edges of the display, more sources 402 in larger mirror areas 403, which can be of a different pattern shape, can be placed where uniformity is less important. If a different pattern shape is used, then pattern 'fillers' 404, i.e. smaller areas of different shape that 'fill' the areas between the main patterns, can be used.

The invention claimed is:

1. A display backlight comprising a plurality of discrete light sources spaced from a diffuser, the sources being arranged as sets, each of at least some of which comprises a plurality of the sources, cooperating with a mirror structure which surrounds the set to form a region, the regions being arranged as a two-dimensional array which substantially tessellates the area of the backlight, each mirror structure comprising a plurality of mirror segments, of curved concave cross-section in a plane substantially perpendicular to the diffuser, extending from around the sources of the set towards the diffuser, the edges of adjacent mirror segments of adjacent regions meeting at a meeting line with all of the meeting lines being at the diffuser or between the diffuser and the sources, wherein the plurality of mirror segments is at least three mirror segments,
wherein the light sources in different regions are arranged in a non-regular pattern, and the light sources are white light emitting light sources, and
the regions comprise a first set of regions and a second set of regions, wherein the first set of regions has a different configuration of light sources as compared to the second set of regions.

2. A backlight as claimed in claim 1, in which each mirror segment is arranged to reflect light incident thereon, at least from the sources adjacent the mirror segment, directly onto the diffuser.

3. A backlight as claimed in claim 1, in which each of the at least some sets comprises at least three sources.

4. A backlight as claimed claim 1, in which the sources are all of substantially the same type.

5. A backlight as claimed in claim 1, in which the sources are substantially point-sources.

6. A backlight as claimed in claim 1, in which the sources are of Lambertian type.

7. A backlight as claimed in claim 1, in which the sources are light emitting diodes.

8. A backlight as claimed in claim 1, in which the light sources are substantially white light sources.

9. A backlight as claimed in claim 1, in which the adjacent ends of adjacent mirror segments of each region meet at curved lines.

10. A backlight as claimed in claim 1, in which the meeting lines are straight lines.

11. A backlight as claimed in claim 10, in which all of the meeting lines are in a first common plane.

12. A backlight as claimed in claim 11, in which each plane, which intersects the mirror segments and which is parallel to the first common plane, intersects each of the mirror segments at a straight line of intersection.

13. A backlight as claimed in claim 12, in which each mirror segment is of substantially constant cross-sectional shape along each line of intersection.

14. A backlight as claimed in claim 13, in which the cross-sectional shape is substantially defined by the lateral distance with respect to an origin at the meeting line being proportional to distance perpendicularly from the first common plane raised to the power 1.2.

15. A backlight as claimed in claim 1, in which the diffuser is a plane diffuser.

16. A backlight as claimed in claim 15, in which the first common plane is substantially at the diffuser plane.

17. A backlight as claimed in claim 16, in which each plane, which intersects the mirror segments and which is parallel to the first common plane, intersects each of the mirror segments at a straight line of intersection.

18. A backlight as claimed in claim 17, in which each mirror segment is of substantially constant cross-sectional shape along each line of intersection.

19. A backlight as claimed in claim 18, in which the cross-sectional shape is substantially defined by the lateral distance with respect to an origin at the meeting line being proportional to distance perpendicularly from the first common plane raised to the power 1.2.

20. A backlight as claimed in claim 1, in which the sources are disposed substantially in a second common plane.

21. A backlight as claimed in claim 20, in which the diffuser is a plane diffuser and the second common plane is substantially parallel to the diffuser plane.

22. A backlight as claimed in claim 20, in which the mirror segments of each region meet the second common plane at a polygon.

23. A backlight as claimed in claim 22, in which the sources of each of the at least some sets are arranged in a pattern having an outline which is similar to the polygon.

24. A display comprising a backlight as claimed in claim 1 disposed behind a spatial light modulator.

25. A display as claimed in claim 24, in which the modulator comprises a liquid crystal device.

26. A backlight as claimed in claim 1, in which each of the at least some sets comprises at least nine sources.

27. A backlight as claimed in claim 1, wherein the curved concave cross-section in the plane substantially perpendicular to the diffuser has a shape of curvature perpendicular to the diffuser that follows a simple polynomial function.

28. A backlight as claimed in claim 1, wherein the mirror structures in the first set of regions are closer than in the second set of regions and the mirror structures in the second set of regions are larger than in the first set of regions.

29. A backlight as claimed in claim 1, wherein the first set of regions is centrally located in the backlight and the second set of regions is located toward an edge of the backlight.

30. A backlight as claimed in claim 1, wherein the first set of regions has a different shape or different number of light sources from the second sets of regions.

31. A backlight as claimed in claim 1, wherein the regions further comprise a third set of filler regions that are a different shape from the first and second sets regions, and the filler regions fill areas between the first and second regions.

32. A display backlight comprising a plurality of discrete light sources spaced from a diffuser, the sources being arranged as sets, each of at least some of which comprises a plurality of the sources, cooperating with a mirror structure which surrounds the set to form a region, the regions being arranged as a two-dimensional array which substantially tessellates the area of the backlight, each mirror structure comprising a plurality of mirror segments, of curved concave cross-section in a plane substantially perpendicular to the diffuser, extending from around the sources of the set towards the diffuser, the edges of adjacent mirror segments of adjacent regions meeting at a meeting line with all of the meeting lines being at the diffuser or between the diffuser and the sources, wherein the plurality of mirror segments is at least three mirror segments, wherein the regions comprise a first set of regions, each of which is of a first shape or has a first number of sources, disposed in an inner area of the backlight and a second set of regions, each of which is of a second shape different from the first shape or has a second number of sources different from the first number of sources, disposed in an outer area of the backlight.

33. A backlight as claimed in claim 32, in which the regions of the first and second sets are triangular and square, respectively.

34. A backlight as claimed in claim 32, in which the second number is larger than the first number.

\* \* \* \* \*